(12) United States Patent
Shell et al.

(10) Patent No.: US 10,697,491 B2
(45) Date of Patent: Jun. 30, 2020

(54) CAMERA WITH DUAL ROTATIONAL JOINT

(71) Applicant: Fluke Corporation, Everett, WA (US)

(72) Inventors: Dennis B. Shell, Webster, MN (US);
Charles E. Marzette, Jr., Kirkland, WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 15/851,181

(22) Filed: Dec. 21, 2017

(65) Prior Publication Data
US 2019/0195274 A1    Jun. 27, 2019

(51) Int. Cl.
*H04N 5/225* (2006.01)
*F16C 11/10* (2006.01)
*G05G 5/06* (2006.01)
*H04N 5/33* (2006.01)
*H04N 5/247* (2006.01)

(52) U.S. Cl.
CPC .............. *F16C 11/10* (2013.01); *G05G 5/065* (2013.01); *H04N 5/2251* (2013.01); *H04N 5/247* (2013.01); *H04N 5/33* (2013.01)

(58) Field of Classification Search
CPC ....................................... F16C 11/10
USPC .......................................... 348/370
See application file for complete search history.

(56) References Cited

U.S. PATENT DOCUMENTS

| | | | |
|---|---|---|---|
| 9,635,282 B2 | 4/2017 | McManus et al. | |
| 2007/0036540 A1 | 2/2007 | Nama et al. | |
| 2009/0298550 A1* | 12/2009 | Kang | G06F 3/147 455/566 |
| 2017/0061663 A1 | 3/2017 | Johnson et al. | |

FOREIGN PATENT DOCUMENTS

| | | |
|---|---|---|
| EP | 0682447 A2 | 11/1995 |
| EP | 2426910 A1 | 3/2012 |

OTHER PUBLICATIONS

EP Pat. App. No. 18215203.3, Extended European Search Report dated May 13, 2019, 8 pages.

* cited by examiner

*Primary Examiner* — Joel W Fosselman
(74) *Attorney, Agent, or Firm* — Fredrikson & Byron, P.A.

(57) ABSTRACT

Exemplary embodiments provides a camera, having a first camera sub-assembly, a hub coupled to the first camera sub-assembly, a second camera sub-assembly coupled to the hub and rotatable relative thereto and a third camera sub-assembly coupled to the hub and rotatable relative thereto. The third camera sub-assembly can be in electrical communication with the first camera sub-assembly and/or the second camera sub-assembly via the hub. The hub can include a slot to guide electrical cable(s). Net torque acting on the camera can be zero such that one of the first rotational coupling or the second rotational coupling when rotated to a new position via an applied torque remains in the new position when the applied torque is released.

22 Claims, 10 Drawing Sheets

CAMERA WITH DUAL ROTATIONAL JOINT

BACKGROUND

Thermal imaging cameras are used in a variety of situations. For example, thermal imaging cameras are often used during maintenance inspections to thermally inspect equipment. Example equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

Typically the imaging components of such cameras (such as lens, image sensors and the like) are housed in a rigid camera body and is attached to a handle. Such cameras also include a display to display images acquired by the camera. In some such instances, the camera body and/or the display may be stationary relative to the handle, which may be cumbersome to use, particularly if the camera is operated in tightly confined spaces.

SUMMARY

In an aspect, the present disclosure provides a camera having a hub coupled to first camera sub-assembly, a first rotational coupling rotatably coupled to the hub permitting rotational movement between the first rotational coupling and the hub, the first rotational coupling carrying and/or coupled to a second camera sub-assembly, and a second rotational coupling rotatably coupled to the hub permitting rotational movement between the second rotational coupling and the hub, the second rotational coupling carrying and/or coupled to a third camera sub-assembly, two or more of the first camera sub-assembly, the second camera sub-assembly and the third camera sub-assembly being in electrical communication via the hub.

In another aspect, this disclosure provides a camera with a central hub, a first camera sub-assembly coupled to the central hub and having electrical components, a rotational coupling rotatably coupled about the central hub permitting rotation of the rotational coupling about the central hub, the rotational coupling carrying and/or coupled to a second camera sub-assembly, the second camera sub-assembly electrically connecting to the first camera sub-assembly via an electrical cable extending through the central hub, and the rotational coupling comprising a slot defined on a perimeter of the rotational coupling and rotating with the rotational coupling, the electrical cable extending through the slot towards the central hub, the slot guiding the electrical cable, such that when the rotational coupling rotates about the central hub, the electrical cable is guided by the slot so as to wrap the electrical cable around the central hub.

In a further aspect, this disclosure provides a hub non-rotationally coupled to first camera sub-assembly, a first rotational coupling rotatably coupled to the hub permitting rotational movement between the first rotational coupling and the hub, the first rotational coupling carrying and/or coupled to a second camera sub-assembly, and a second rotational coupling rotatably coupled to the hub permitting rotational movement between the second rotational coupling and the hub, the second rotational coupling carrying and/or coupled to a third camera sub-assembly, the second rotational coupling being physically engaged to the first rotational coupling, wherein, when an applied torque acts on one of the first rotational coupling or the second rotational coupling the hub remains stationary, and the one of the first rotational coupling or the second rotational coupling rotates to a new rotational position independently of the other of the first rotational coupling or the second rotational coupling, and when the applied torque stops acting on the one of the first rotational coupling or the second rotational coupling, net torque acting on the camera is zero such that the one of the first rotational coupling or the second rotational coupling remains in the new position.

Aspects of the present disclosure also include the following numbered embodiments:

1. A camera, comprising
   a hub coupled to first camera sub-assembly;
   a first rotational coupling rotatably coupled to the hub permitting rotational movement between the first rotational coupling and the hub, the first rotational coupling carrying and/or coupled to a second camera sub-assembly, and
   a second rotational coupling rotatably coupled to the hub permitting rotational movement between the second rotational coupling and the hub, the second rotational coupling carrying and/or coupled to a third camera sub-assembly,
   two or more of the first camera sub-assembly, the second camera sub-assembly and the third camera sub-assembly being in electrical communication via the hub.
2. The camera of embodiment 1, wherein the hub is centered on a rotational axis such that the hub is symmetric about the rotational axis.
3. The camera of embodiment 1 or 2, wherein the second camera sub-assembly is rotatable with respect to the hub independently of rotation of the third camera sub-assembly with respect to the hub.
4. The camera of embodiment 1 or any previous embodiment, wherein the second rotational coupling being mounted on an exterior surface of the hub, and rotatable relative thereto.
5. The camera of embodiment 4 or any previous embodiment, wherein the hub is connected to the first camera sub-assembly via a bracket.
6. The camera of embodiment 5 or any previous embodiment, further comprising a first detent, and wherein the first detent is located between the first rotational coupling and the hub, the first detent providing a catch between the first rotational coupling and the hub to permit incremental rotational movement of the first rotational coupling relative to the hub.
7. The camera of embodiment 6 or any previous embodiment, wherein the first detent comprises a first detent ring, the first detent ring having a plurality of apertures, one of the plurality of apertures receiving a first spring-biased detent ball housed in an external protrusion of the first rotational coupling, the first spring-biased detent ball being biased by a spring to be received in one of the plurality of apertures thereby engaging the first detent ring with the first rotational coupling.
8. The camera of embodiment 7 or any previous embodiment, wherein the first detent permits controlled rotation of the second camera sub-assembly about the hub, such that each aperture of the plurality of apertures of the first detent ring corresponds to a rotational position of the second camera sub-assembly.
9. The camera of embodiment 5 or any previous embodiment, wherein the second rotational coupling is mounted on the exterior surface of the hub.
10. The camera of embodiment 9 or any previous embodiment, further comprising a second detent located between the second rotational coupling and the bracket, the second detent providing a catch between the bracket and the second rotational coupling to permit incremental rotational movement of the second rotational coupling.

11. The camera of embodiment 10 or any previous embodiment, wherein the second rotational coupling has an exterior surface having a plurality of apertures, one of the plurality of apertures of the exterior surface of the second rotational coupling, receiving a second spring-biased detent ball housed in a groove on the bracket.

12. The camera of embodiment 11 or any previous embodiment, wherein each aperture of the plurality of apertures of the exterior surface of the second rotational coupling corresponds to a rotational position of the third camera sub-assembly.

13. The camera of embodiment 12 or any previous embodiment, wherein the second spring-biased detent ball being biased to be received in one of the plurality of apertures of the exterior surface of the second rotational coupling, the second spring-biased detent ball frictionally resting against the groove in the bracket when the second rotational coupling is in between two rotational positions.

14. A camera, comprising:
a central hub;
a first camera sub-assembly coupled to the central hub and having electrical components;
a rotational coupling rotatably coupled about the central hub permitting rotation of the rotational coupling about the central hub, the rotational coupling carrying and/or coupled to a second camera sub-assembly, the second camera sub-assembly electrically connecting to the first camera sub-assembly via an electrical cable extending through the central hub,
the rotational coupling comprising a slot defined on a perimeter of the rotational coupling and rotating with the rotational coupling, the electrical cable extending through the slot towards the central hub, the slot guiding the electrical cable, such that when the rotational coupling rotates about the central hub, the electrical cable is guided by the slot so as to wrap the electrical cable around the central hub.

15. The camera of embodiment 14 or any previous embodiment, wherein the electrical cable generally conforms to contours of the perimeter of the central hub when the rotational coupling is rotated.

16. The camera of embodiment 14 or any previous embodiment, wherein the rotational coupling comprises a frictional connector permitting a rigid connection between the rotational coupling and the second camera sub-assembly.

17. The camera of embodiment 16 or any previous embodiment, wherein the frictional connector comprises a pair of wedges to frictionally hold the electrical cable therebetween, such that when the second camera sub-assembly is rotated, the electrical cable is held generally stationary relative to the second camera sub-assembly.

18. The camera of embodiment 14 or any previous embodiment, wherein the electrical cable has a first end and a second end opposite to the first end, the first end of the electrical cable being located in the second camera sub-assembly, the second end of the electrical cable being connected to the electrical components of the first camera sub-assembly.

19. The camera of embodiment 18 or any previous embodiment, further comprising a guide post to guide and anchor the electrical cable at a location within the central hub, and/or between the first end and the second end.

20. The camera of embodiment 14 or any previous embodiment, further comprising a third camera sub-assembly, wherein the rotational coupling and/or the second camera sub-assembly is positioned axially between first camera sub-assembly and the third camera sub-assembly.

21. A camera, comprising:
a hub non-rotationally coupled to first camera sub-assembly;
a first rotational coupling rotatably coupled to the hub permitting rotational movement between the first rotational coupling and the hub, the first rotational coupling carrying and/or coupled to a second camera sub-assembly, and
a second rotational coupling rotatably coupled to the hub permitting rotational movement between the second rotational coupling and the hub, the second rotational coupling carrying and/or coupled to a third camera sub-assembly,
the second rotational coupling being physically engaged to the first rotational coupling,
wherein, when an applied torque acts on one of the first rotational coupling or the second rotational coupling:
the hub remains stationary, and
the one of the first rotational coupling or the second rotational coupling rotates to a new rotational position independently of the other of the first rotational coupling or the second rotational coupling, and
when the applied torque stops acting on the one of the first rotational coupling or the second rotational coupling, net torque acting on the camera is zero such that the one of the first rotational coupling or the second rotational coupling remains in the new position.

22. The camera of embodiment 21 or any previous embodiment, comprising the second rotational coupling being indirectly physically engaged to the first rotational coupling.

DETAILED DESCRIPTION

Figure 1A:
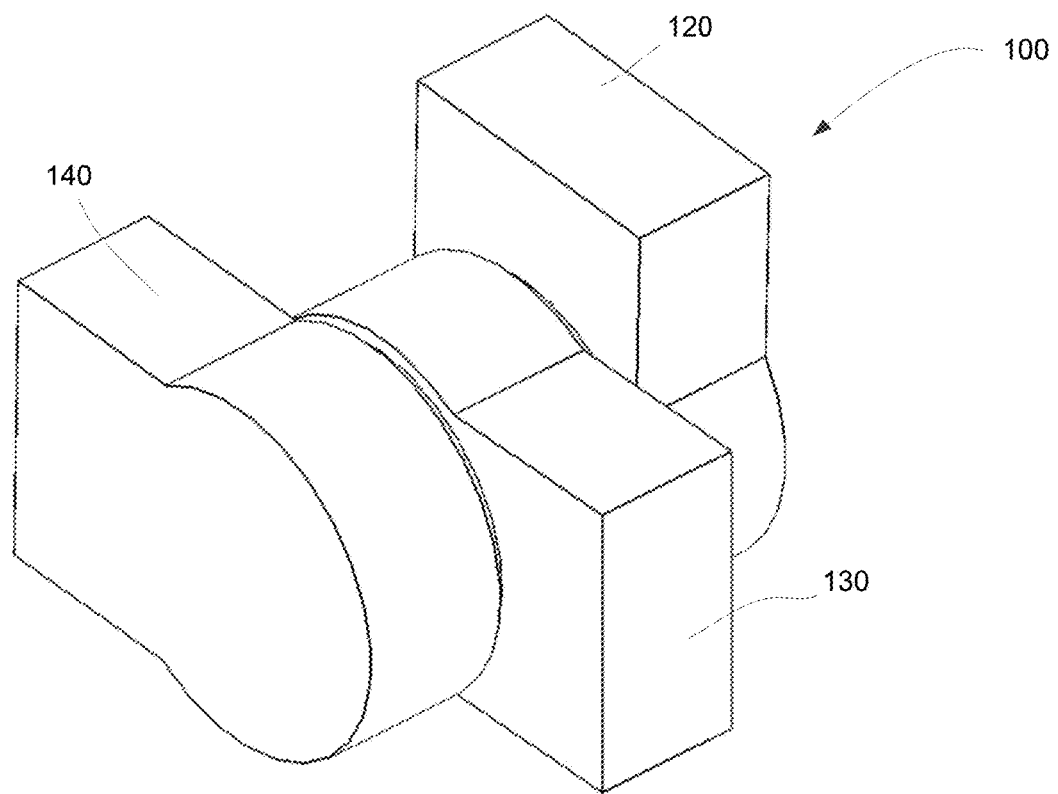
FIG. 1A is a perspective front view of an example camera according to an embodiment.

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

FIGS. 1A-1C and 2 show front and back perspective views, respectively of an example camera 100, which includes a housing 102, lens assemblies 104, 106, a display 108, a laser 110, and a trigger control 112. The camera 100 also includes buttons 116 that perform various functions as will be described further below. Housing 102 houses the various components of camera 100. A lateral portion of camera 100 includes a carrying handle 118 for holding and operating the camera 100 with an operator's hand. The camera 100's housing 102 can include a first camera sub-assembly 120, a second camera sub-assembly 130 and a third camera sub-assembly 140 for containing various components of the camera 100. For instance, in the illustrated embodiment, the first camera sub-assembly 120 can include the handle and/or house one or more batteries 142 therein. The second camera sub-assembly 130 can include lens assemblies 104, 106, trigger control 112, electrical circuitry and house interior components of the camera 100. The third camera sub-assembly 140 can include the display 108. Alternatively, other embodiments whereby the components are differently arranged are also contemplated within the scope of the present disclosure.

Continuing with FIGS. 1A-1C and 2, in some examples, the camera 100 can be configured so as to be responsive to a particular range of wavelengths of electromagnetic radiation. For instance, the camera 100 can be a thermal imaging camera. A thermal imaging camera may be used to detect heat patterns across a scene, including an object or objects, under observation. The thermal imaging camera may detect infrared radiation given off by the scene and convert the infrared radiation into an infrared image indicative of the heat patterns. In some embodiments, the thermal imaging camera may also capture visible light from the scene and convert the visible light into a visible light image. Depending on the configuration of the thermal imaging camera, the camera 100 may include infrared optics to focus the infrared radiation on an infrared sensor and visible light optics to focus the visible light on a visible light sensor.

In embodiments where the camera 100 is a thermal imaging camera, at least one of the lens assemblies (e.g., lens assembly 104) can be an infrared lens assembly 104, while optionally, another lens assembly (lens assembly 106) can be a visible lens assembly 106. In such cases, infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112.

Visible light lens assembly 106 includes at least one lens 144 that focuses visible light energy on a visible light sensor for generating a visible light image. Visible light lens assembly 106 defines a visible light optical axis which passes through the center of curvature of the at least one lens 144 of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens 146 that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series. In some examples, the infrared lens assembly 104 may include lenses having diffractive or reflective properties or elements. Additional optical components such as mirrors (e.g., Fresnel mirrors) and the like may be included within or otherwise proximate to the infrared lens assembly 104.

Figure 1B:
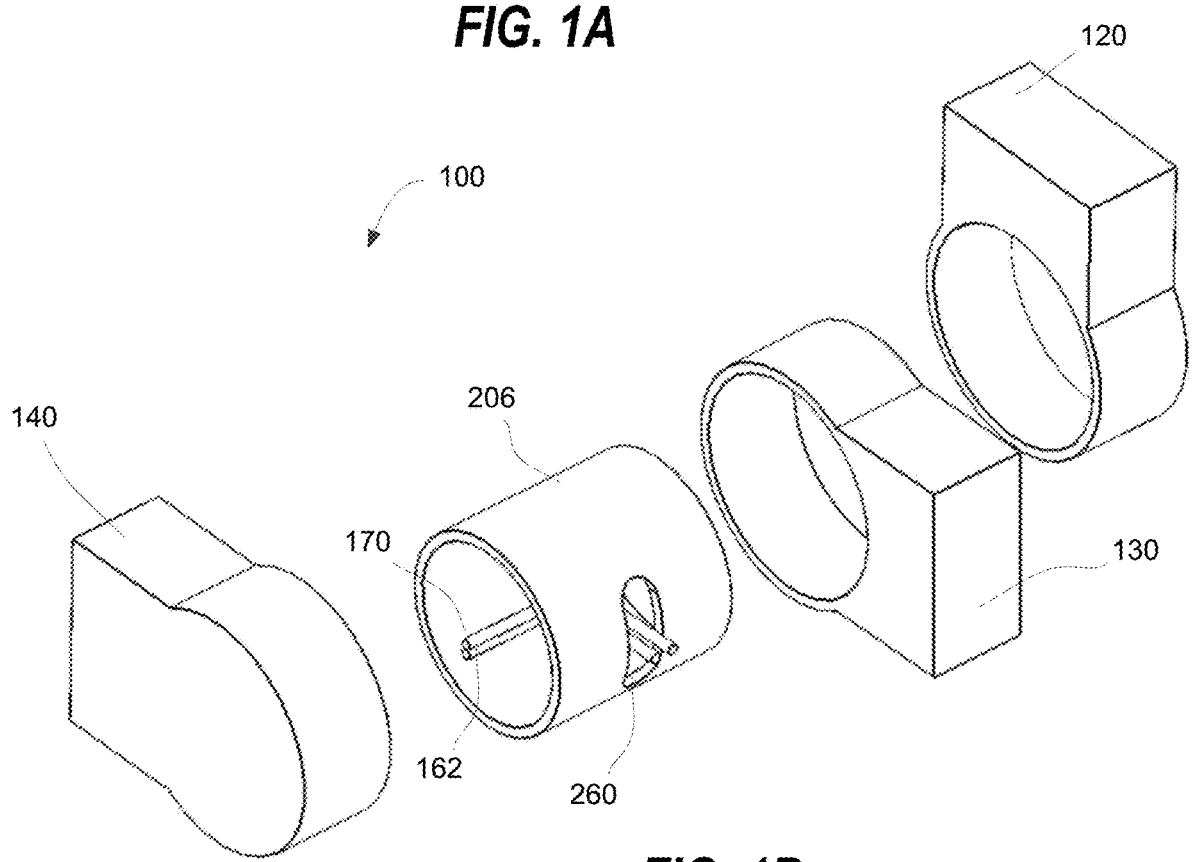
FIG. 1B is an exploded perspective view of the
FIG. 1C is a perspective front view of the camera of FIG. 1A with various camera sub-assemblies illustrated in detail.
Figure 1C:
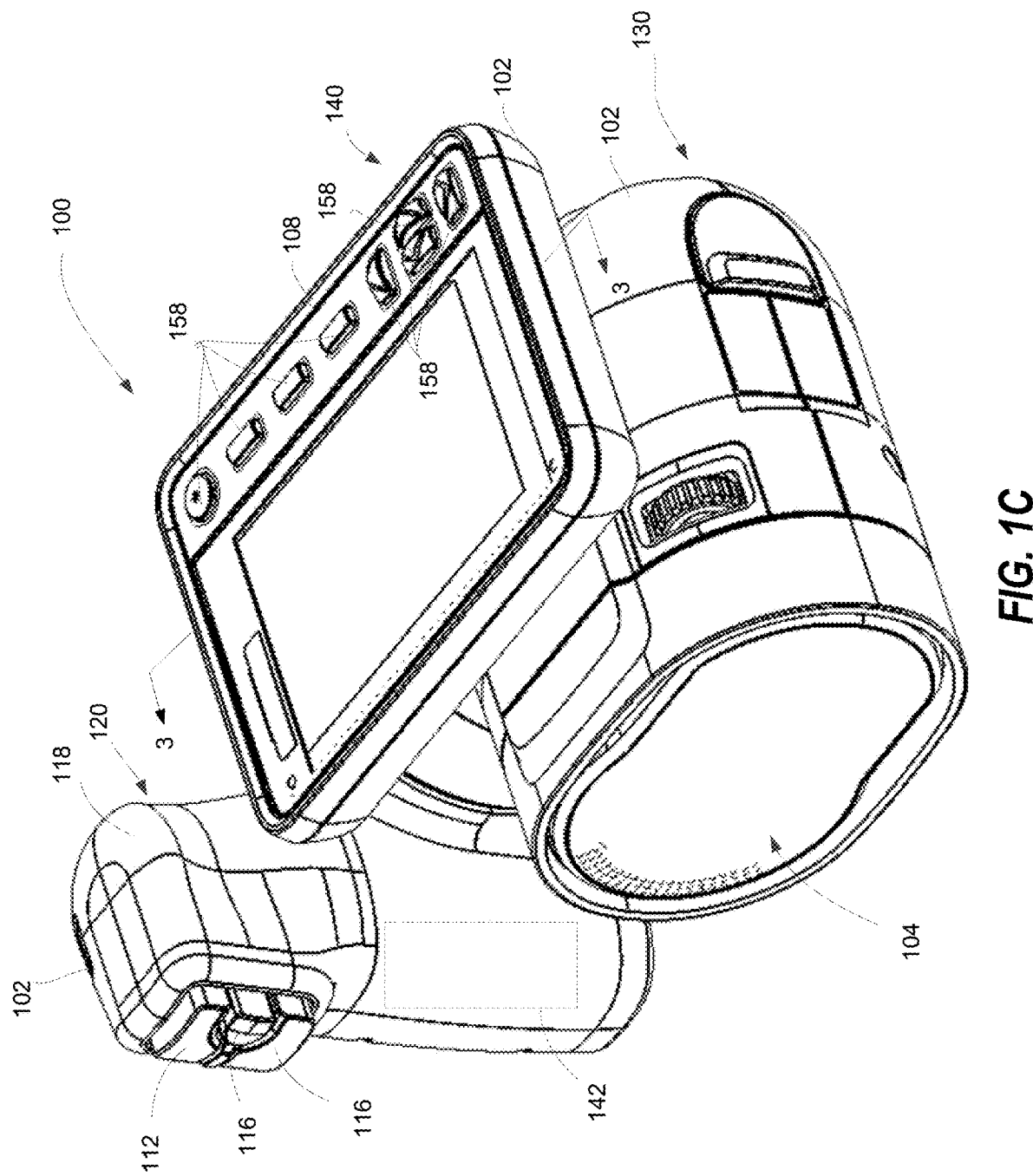
Figure 2:
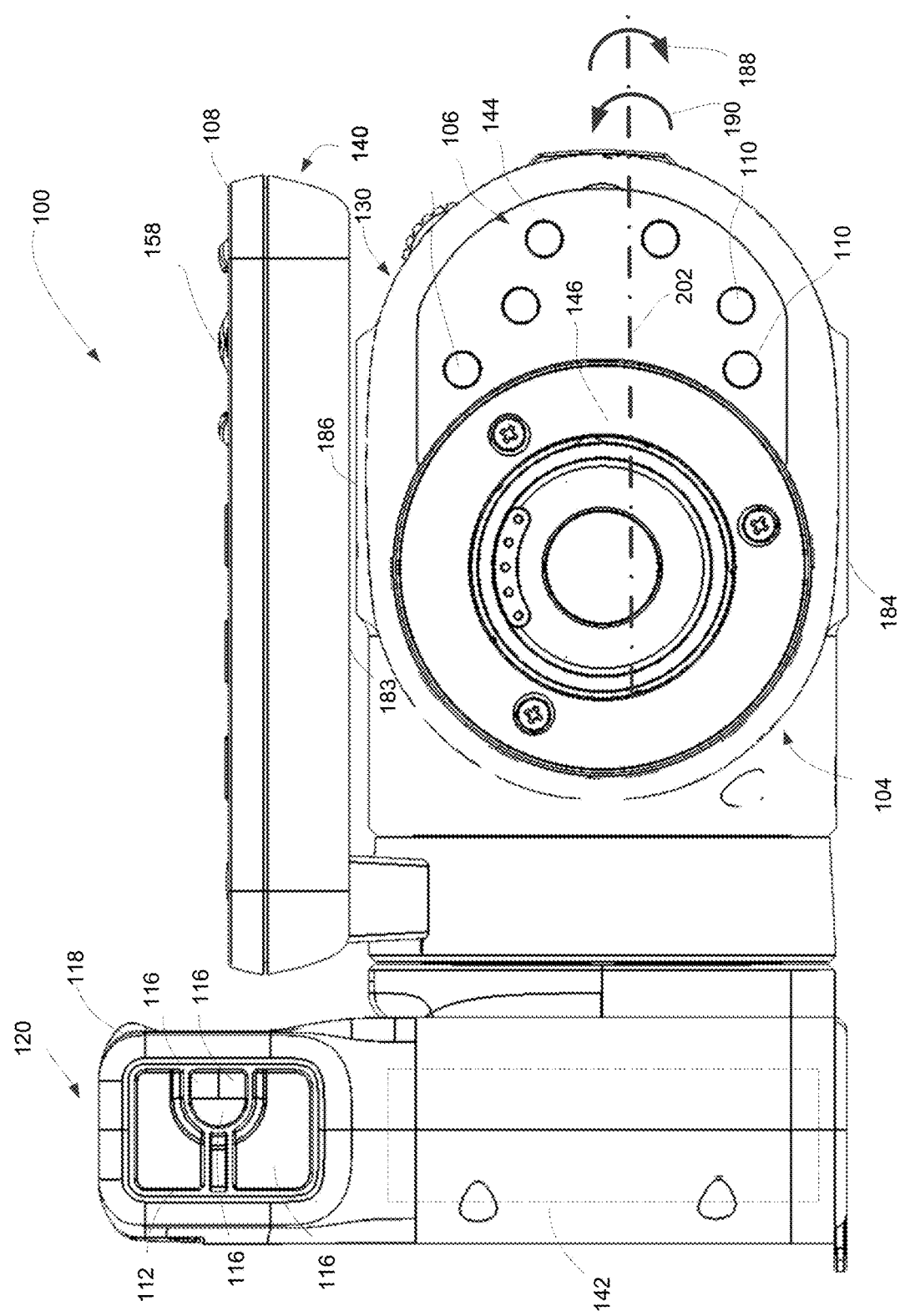
FIG. 2 is a perspective back view of the camera of FIG. 1C.

With continued reference to FIGS. 1C and 2, the camera 100 may also include a focus mechanism coupled to the infrared lens assembly 104 and/or visible lens assembly 106, to move at least one lens 146 of the infrared lens assembly 104 (and/or at least one lens 144 of the visible lens assembly 106) so as to adjust the focus of an infrared image generated by the thermal imaging camera. Additionally or alternatively, the focus mechanism may move one or more focal plane arrays (as will be described below) relative to one or more lenses of the lens assembly 104, or lens assembly 106. In some examples, camera 100 includes focus ring for moving one or both of the FPA and the at least one lens (144 and/or 146) to various focus positions so as to focus the infrared image captured by thermal imaging camera 100. In some examples, camera 100 may include an automatically adjusting focus mechanism. An automatically adjusting focus mechanism may be operatively coupled to at least one lens of infrared lens assembly 104 and configured to automatically move the at least one lens (144 and/or 146) to various focus positions, e.g., in response to instructions from camera 100. In one application of such an example, camera 100 may use laser 110 to electronically measure a distance between an object in a target scene and the camera 100, referred to as the distance-to-target. Camera 100 may then control the automatically adjusting focus mechanism to move the at least one lens (144 and/or 146) of lens assembly 104 to a focus position that corresponds to the distance-to-target data determined by the camera 100. The focus position may correspond to the distance-to-target data in that the focus position may be configured to place the object in the target scene at the determined distance in focus.

In some examples, a focus ring (not shown in FIGS. 1C and 2) may be manually rotated about at least a portion of housing 102 so as to move the at least one lens (144 and/or 146) to which the focus ring is operatively coupled. In some examples where the camera 100 is a thermal imaging camera, focus ring can also be operatively coupled to display 108 such that rotation of focus ring causes at least a portion of a visible light image and at least a portion of an infrared image concurrently displayed on display 108 to move relative to one another. In different examples, camera 100 may include a manual focus adjustment mechanism that is implemented in a configuration other than focus ring, or may, in other embodiments, simply maintain a fixed focus. In certain embodiments, the focus position set by the automatically adjusting focus mechanism may be manually overridden by an operator, e.g., by rotating focus ring.

The camera 100 can include a variety of user input media for controlling the operation of the camera 100 and adjusting different settings of the camera 100. Example control functions may include adjusting the focus of the light optics, opening/closing a shutter, capturing an image, or the like. In the example of FIGS. 1C and 2, camera 100 includes a depressible trigger control 112 for capturing an image, and buttons 116, which form part of the user interface 158, for controlling other aspects of the operation of the camera 100. A different number or arrangement of user input media are possible, and it should be appreciated that the disclosure is not limited in this respect.

Figure 3:
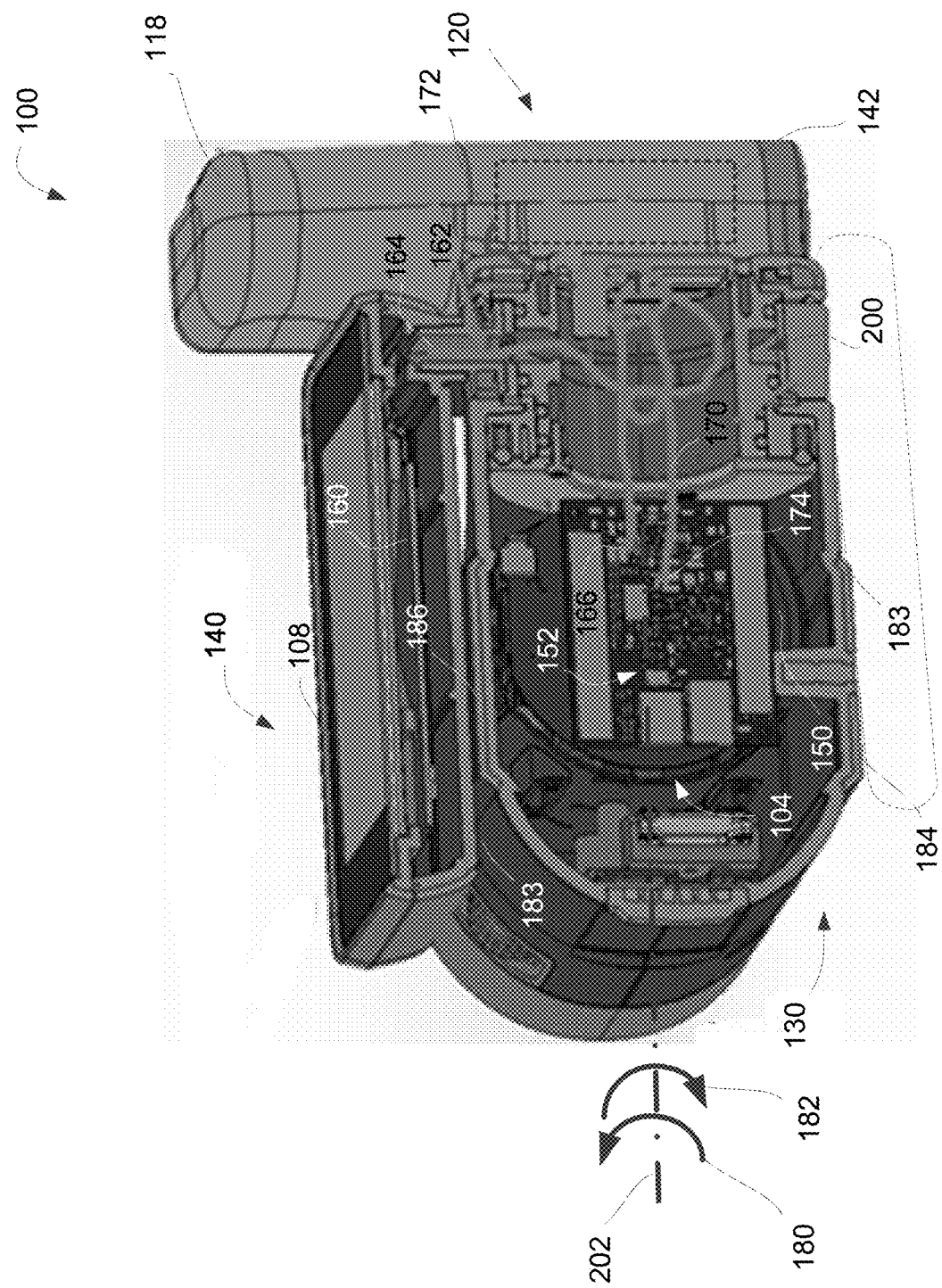
FIG. 3 is a sectional perspective view of the camera of FIG. 1C, taken along the plane 3-3 shown therein.

FIG. 3 is a sectional perspective view of the camera 100 taken along plane 3-3 shown in FIG. 1C. As seen in FIG. 3, the camera 100 can include electrical circuits (e.g., housed within the housing 102). The electric circuits may advantageously arranged in a primary circuit board 150. The camera 100 may include an image sensor in electrical communication with the primary circuit board 150 (and/or mounted thereon). The electrical circuits may also include a processor 152, storage and/or memory.

The image sensor may include one or more focal plane arrays (FPA) that generate electrical signals in response to electromagnetic energy received through electromagnetic lens assembly 104. For instance, if the camera 100 is a thermal imaging camera, each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by electrical circuits, such as a processor 152 and processed into an infrared image displayed on display 108.

For instance, in examples in which infrared sensor includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a sensor pixel, a two-dimensional image or picture representation of the infrared radiation can be further generated by translating the changes in resistance of each detector element into a time-multiplexed electrical signal that can be processed for visualization on a display 108 or storage in memory (e.g., of a computer). The processor 152 may measure the change in resistance of each bolometer by applying a current (or voltage) to each bolometer and measure the resulting voltage (or current) across the bolometer. Based on these data, the electrical circuits processor 152 can determine the amount of infrared energy emitted by different portions of a target scene and control display 108 to display 108 a thermal image of the target scene.

The processor 152 may perform image processing functions, as described in the commonly assigned applications U.S. Ser. No. 13/963,802, titled "Visible Light and IR Combined Camera", and U.S. Ser. No. 14/837,757, titled "Edge Enhancement For Thermal-Visible Combined Images and Cameras," the entire contents of each of which is hereby incorporated by reference. In addition, in these and other examples, processor 152 may be in electrical communication with the display 108 and may thus be able to control display 108 as will be described further below. For instance, the processor 152 can control the display 108 to concurrently display 108 at least a portion of the visible light image captured by thermal imaging camera 100 and at least a portion of the infrared image captured by thermal imaging camera 100. Such a concurrent display 108 may be useful in that an operator may reference the features displayed in the visible light image to help understand the features concurrently displayed in the infrared image, as the operator may more easily recognize and distinguish different real-world features in the visible light image than the infrared image. In various examples, processor 152 may control display 108 to display 108 the visible light image and the infrared image in side-by-side arrangement, in a picture-in-picture arrangement, where one of the images surrounds the other of the images, or any other suitable arrangement where the visible light and the infrared image are concurrently displayed. Additionally, in some embodiments, the processor 152 can interpret and execute commands from user interface 158 (best seen in FIGS. 1 and 2). This can involve processing of various input signals. Components (e.g. motors, or solenoids) proximate the electrical circuits can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 152.

The processor 152 can further include other electrical components to assist with the processing and control of the camera 100. Advantageously, these electrical components can be housed in the primary circuit board 150. For example, in some embodiments, front end signal conditioners, and an analog-to-digital converter (ADC). Optionally, the ADC can be incorporated into the processor 152. In such a case, analog signals are not digitized until reaching the processor 152. Moreover, some embodiments can include additional on board memory for storage of processing command information and scene data, prior to transmission to the display 108. During operation of thermal imaging camera 100, processor 152 can control various functions of the camera 100 with the aid of instructions associated with program information that is stored in memory to generate a visible light image and an infrared image of a target scene. Processor 152 further controls display 108 to display 108 the visible light image and/or the infrared image generated by thermal imaging camera 100.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image.

In some examples, thermal imaging camera 100 collects or captures the infrared energy and visible light energy substantially simultaneously (e.g., at the same time) so that the visible light image and the infrared image generated by the camera 100 are of the same scene at substantially the same time. In these examples, the infrared image generated by thermal imaging camera 100 is indicative of localized temperatures within the scene at a particular period of time while the visible light image generated by the camera 100 is indicative of the same scene at the same period of time. In other examples, thermal imaging camera may capture infrared energy and visible light energy from a scene at different periods of time.

During operation of the camera 100, an operator may wish to view a thermal image of a scene and/or a visible light image of the same scene generated by the camera 100. Accordingly, thermal imaging camera 100 may include a display 108. The display 108 can display 108 the infrared image and the visible light image generated by the camera 100 on the display 108, e.g., to help an operator thermally inspect a scene. In the examples of FIGS. 1C and 2, the camera 100 includes display 108, which is located on the back of housing 102 opposite lens assemblies 104, 106. In embodiments where the camera 100 is a thermal imaging camera, display 108 may be configured to display 108 a visible light image, an infrared image, and/or a combined image that includes a simultaneous display 108 of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

The display 108 can, in some cases, be a touch screen display 108 which receives user input by depressing different portions of the screen. Alternatively or in addition, as illustrated, the display 108 can also include buttons 158 on a portion thereof which can permit a user to provide an input. In some embodiments, the display 108 can electrically communicate with the processor 152 to send such user inputs to the processor 152 and/or receive processor 152 controls and data generated by the image sensor. Accordingly, as shown in FIG. 3, the display 108 can include associated electric circuitry housed in a display circuit board 160. The display 108 and the display circuit board 160 are housed in the third portion of the camera 100. The display circuit board 160 can be electrically coupled to the primary circuit board 150 by a first electrical cable 162. The first electrical cable 162 has a first end 164 and a second end 166 opposite to the first end 164. The first end 164 of the first electrical cable 162 is connected to the display circuit board 160. The second end 166 of the first electrical cable 162 is connected to the primary circuit board 150. The electrical cable can include a plurality of electrically conductive wires housed in a cable housing 102. Alternatively, the display circuit board 160 and the primary circuit board 150 can communicate wirelessly.

As described previously, the camera 100 may include electrical circuits (housed in the primary circuit board 150) for generation of data associated with the image of the target scene. For instance, if camera 100 is a thermal imaging camera, an infrared image can be displayed on display 108 and/or stored in memory. For instance, as described above with respect to FIGS. 1C and 2, infrared lens assembly 104 includes at least one lens 146 that takes electromagnetic energy emitted by a target scene and focuses the electromagnetic energy on an image sensor. The image sensor can be or in electrical communication with electrical circuits that respond to the focused electromagnetic energy by generating an electrical signal that can be converted and displayed as an image on display 108.

An operator may interact with camera 100 via user interface 158, which may include buttons, keys, or another mechanism for receiving input from a user. Advantageously, the operator may receive output from thermal imaging camera 100 via display 108. Display 108 may be configured to display 108 an infrared-image and/or a visible light image in any acceptable palette, or color scheme, and the palette may vary, e.g., in response to user control. In some examples, display 108 is configured to display 108 an infrared image in a monochromatic palette such as grayscale. In other examples, display 108 is configured to display 108 an infrared image in a color palette such as, e.g., amber, ironbow, blue-red, or other high contrast color scheme. Combinations of grayscale and color palette displays are also contemplated. In some examples, the display 108 being configured to display 108 such information may include processing capabilities for generating and presenting such image data. In other examples, being configured to display 108 such information may include the ability to receive image data from other components, such as processor 152. For example, processor 152 may generate values (e.g., RGB values, grayscale values, or other display 108 options) for each pixel to be displayed. Display 108 may receive such information and map each pixel into a visual display 108.

Referring again to FIG. 3, the power supply (not shown) delivers operating power to the various components of camera 100 and, in some examples, may include one or more rechargeable or non-rechargeable batteries 142 (shown in dotted lines in FIG. 3) and a power generation circuit. The one or more rechargeable or non-rechargeable batteries 142 may advantageously be housed in the handle of the camera 100 (in the first camera sub-assembly 120). Such embodiments may lead to a camera 100 whose weight is evenly distributed and can be held, balanced and operated (e.g., in a user's hand) without discomfort or portions of the camera 100 sagging unintentionally.

Referring again to FIG. 3, the batteries 142 and/or power generation circuit can be in electrical communication with the primary circuit board 150 by a second electrical cable 170. As seen in FIG. 3, the second electrical cable 170 has a first end 172 and a second end 174 opposite to the first end 172. The first end 172 is electrically connected to the batteries 142, and the second end 174 is attached to the primary circuit board 150.

As described previously, in certain embodiments, the imaging components of such cameras (such as lens, image sensors and the like) are housed in a rigid camera 100 body and is attached to a handle. Such cameras also include a display 108 to display 108 images acquired by the camera 100. In some such instances, if the camera 100 body and/or the display 108 are stationary relative to the handle, it may be cumbersome to use, particularly if the camera 100 is operated in tightly confined spaces. Accordingly, embodiments of the present disclosure provide a camera 100 with a rotational coupling assembly 200 as described below.

As described previously, and with reference to FIGS. 1A-1C, the components of the camera may be arranged in camera sub-assemblies. For example, FIGS. 1A and 1B illustrates three camera sub-assemblies: a first camera sub-assembly 120, a second camera sub-assembly 130 and a third camera sub-assembly 140. In exemplary embodiments, the handle and the battery may be housed in the first camera sub-assembly 120. The lens, primary circuit board 150 and other accessories of the camera 100 body may be housed in a second camera sub-assembly 130. The display 108 and associated display 108 electric circuits (e.g., provided as a display circuit board 160) can be housed in a third camera sub-assembly 140. However, this arrangement of components should not be viewed as limiting, and other arrangements of the camera components are contemplated. Moreover, additional or fewer camera sub-assemblies are contemplated.

According to certain embodiments, components of the camera 100 as shown in FIGS. 1A-1C can be arranged such that the first camera sub-assembly 120 is non-rotatable, whereas the second and third camera sub-assemblies 130, 140 are each rotatable. In advantageous aspects of the present disclosure, the second and third camera sub-assemblies 130, 140 are each independently rotatable relative to the first camera sub-assembly 120. Alternatively, any two of the first, second and third camera sub-assemblies 120, 130, 140 are rotatable.

FIG. 3 illustrates the directions of rotation of the second and third camera sub-assemblies 130, 140 about a rotational axis 202. Appreciably, in some embodiments, the rotation of the third camera sub-assembly 140 can be limited by the rotation of the second camera sub-assembly 130. For instance, when the second camera sub-assembly 130 is at one of its rotational positions, the third camera sub-assembly 140 can rotate about the rotational axis 202 relative to the first camera sub-assembly 120 and the second camera sub-assembly 130. In some embodiments, the third camera sub-assembly 140 is limited to rotating approximately ±90° about the rotational axis 202.

FIG. 3 illustrates the third camera sub-assembly 140 rotated to about 90° relative to the rotational axis 202. Further rotation of the third camera sub-assembly 140 about direction 180 may be limited when the second camera sub-assembly 130 is in the position illustrated in FIG. 3. The third camera sub-assembly 140 can, however, rotate about the direction 182, until the rear surface 183 of the display 108 reaches toward and/or rests against the bottom surface 184 of the housing 102 corresponding to the second camera sub-assembly 130 as shown by dashed lines.

Similarly, when the third camera sub-assembly 140 is at one of its rotational position, the second camera sub-assembly 130 can rotate about the rotational axis 202 relative to the first camera sub-assembly 120 and the third camera sub-assembly 140. In some embodiments, the second camera sub-assembly 130 is limited to rotating approximately ±90° about the rotational axis 202. Referring back to FIG. 2, the second camera sub-assembly 130 is rotated to about 90° relative to the rotational axis 202. In this position, the top surface 186 of the housing 102 corresponding to the second camera sub-assembly 130 is adjacent to (and/or rests against) the rear surface 183 of the display 108 housed in the third camera sub-assembly 140. Further rotation of the second camera sub-assembly 130 about direction 188 (outward) may be limited when the third camera sub-assembly 140 is in the position illustrated in FIG. 2. The second camera sub-assembly 130 can, however, rotate about the direction 190 (inward), until the bottom surface 184 of the housing 102 corresponding to the second camera sub-assembly 130 is adjacent to (and/or rests against) the rear surface 183 of the display 108.

Referring back to FIGS. 1A and 1B, in certain advantageous aspects of the present disclosure, the camera 100 includes rotational coupling assembly 200 to permit rotation of two of the first camera sub-assembly 120, the second camera sub-assembly 130 and the third camera sub-assembly 140. In illustrative embodiments, the first camera sub-assembly 120 remains stationary, whereas the second and third camera sub-assemblies 130, 140 are each rotatable. Alternatively, one of the second or the third camera sub-assembly 140 may remain stationary and the other two of the first, second and third camera sub-assemblies 120, 130, 140 may be rotatable.

Figure 5:
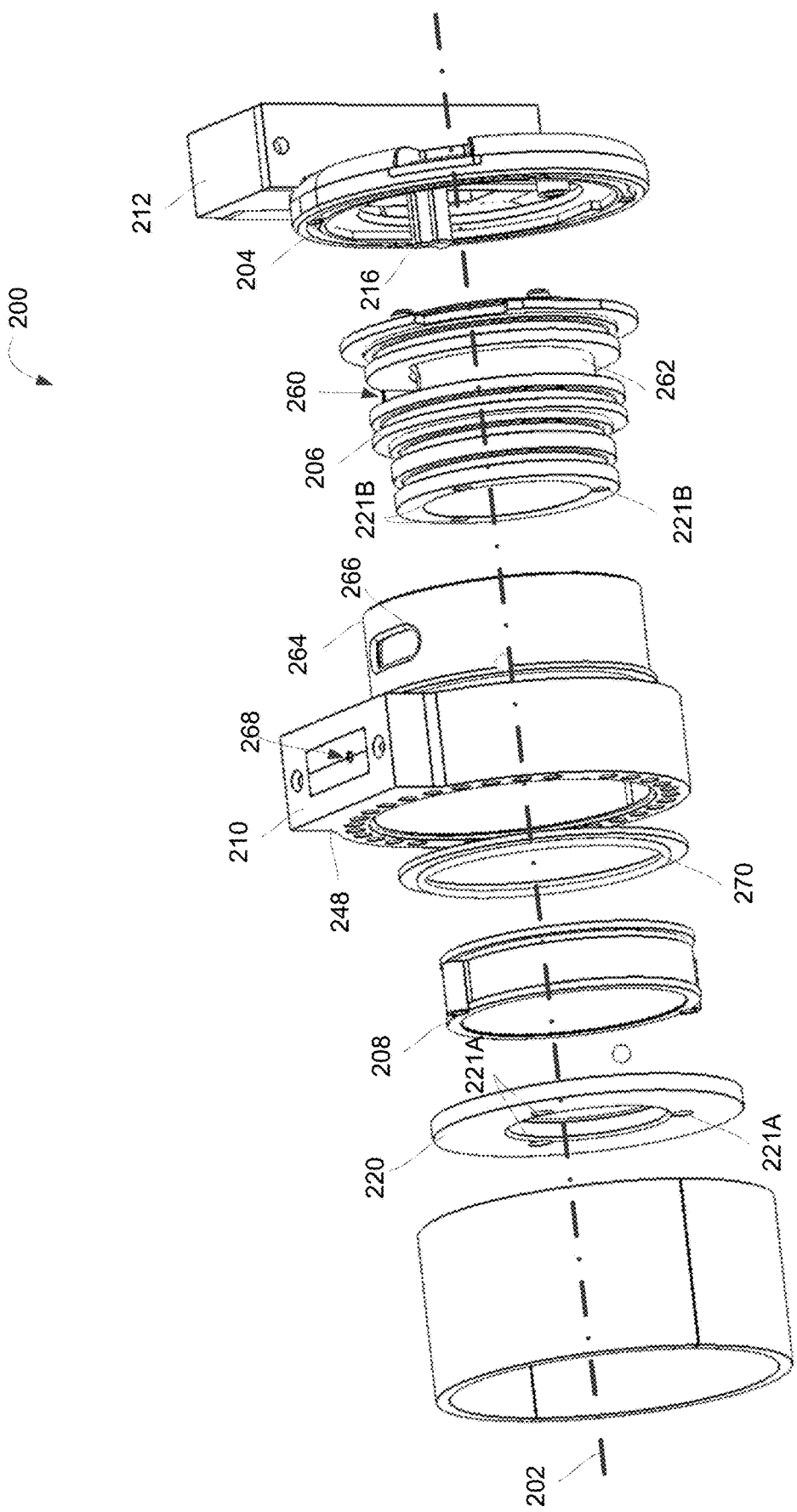
FIG. 5 is an exploded perspective view of the rotational joint of FIG. 4.

Referring back to FIGS. 1A and 1B, and referencing FIG. 5, the rotational coupling assembly 200 comprises a hub 206 centered on the rotational axis 202. In certain embodiments, the hub 206 can connect to each of the first, second and third camera sub-assemblies 120, 130, 140. In certain embodiments as best illustrated in FIGS. 1A and 1B, the hub 206 can be connected such that the first and third camera sub-assemblies 120, 140 are positioned at ends of the hub 206, with the second camera sub-assembly 130 being centered therebetween.

Figure 4:
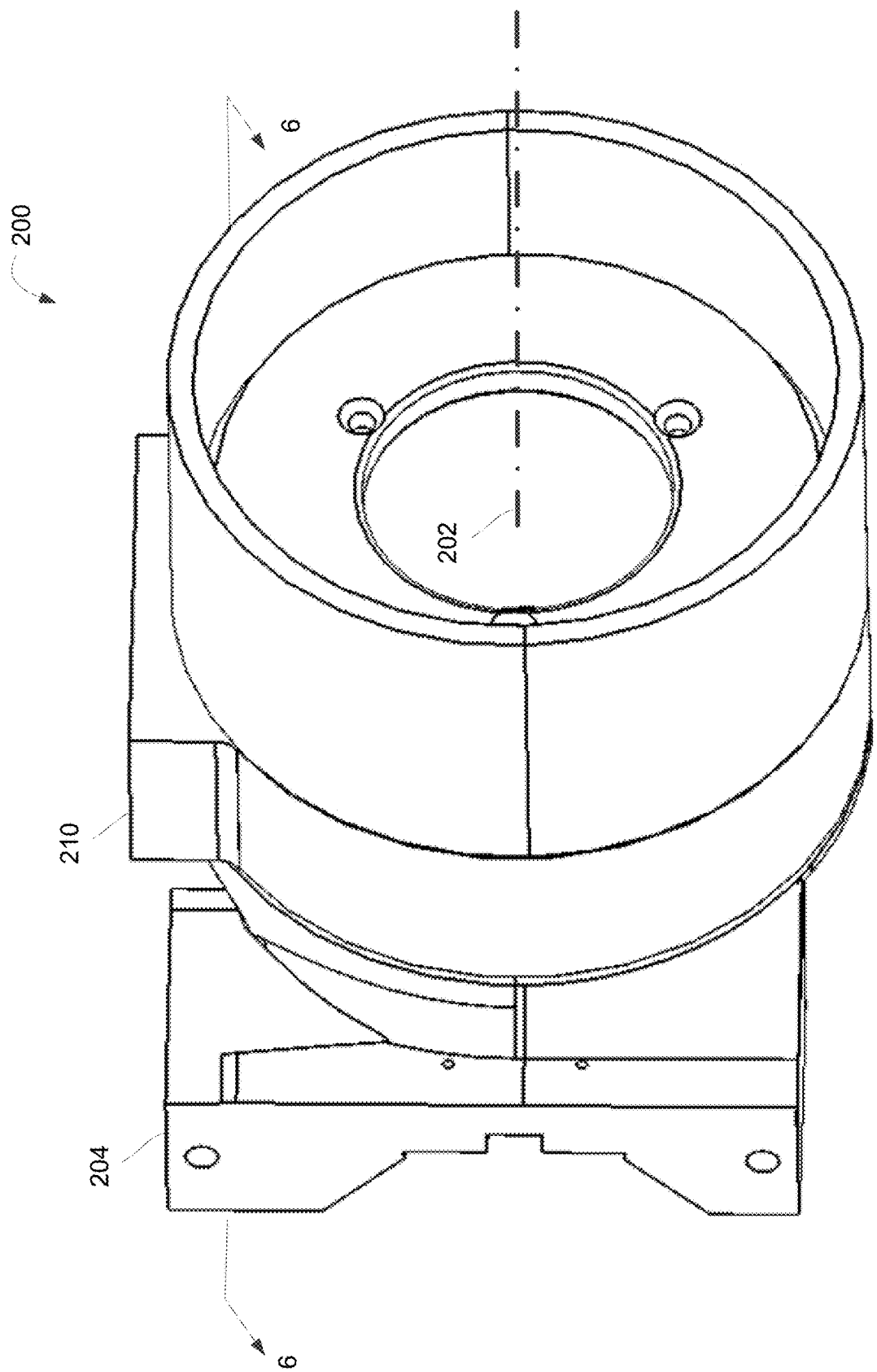
FIG. 4 is a perspective view of a rotational joint according to a non-limiting embodiment suitable for use with the camera of FIG. 1C.

FIGS. 4 and 5 illustrate various views of the rotational coupling assembly 200 according to some exemplary embodiments. As seen therein, the rotational axis 202 passes centrally through the rotational coupling assembly 200, such that components of the rotational coupling assembly 200 are symmetric about the rotational axis 202. FIG. 5 is an exploded perspective view of the rotational coupling assembly 200 according to an illustrative embodiment. The rotational coupling can, according to some embodiments, include a bracket 204 coupled to the central hub 206, a first rotational coupling 208 and a second rotational coupling 210. The bracket 204, the first rotational coupling 208 and the second rotational coupling 210 can be each be centered on and/or symmetric about the rotational axis 202 and can thus be coaxial with each other.

In non-limiting embodiments, the second rotational coupling being physically engaged to the first rotational coupling in a direct or an indirect fashion. If the second rotational coupling is directly physically engaged to the first rotational coupling, the second rotational coupling (or portions thereof) may contact or abut the first rotational coupling (or portions thereof). However, the first and second rotational coupling may slide independently of each other. In alternative embodiments, the first rotational coupling and the second rotational coupling may be indirectly physically engaged to each other. In such embodiments, the second rotational coupling may be spaced apart from the first rotational coupling by way of spacers, seals, etc., as will be described further below.

Figure 6:
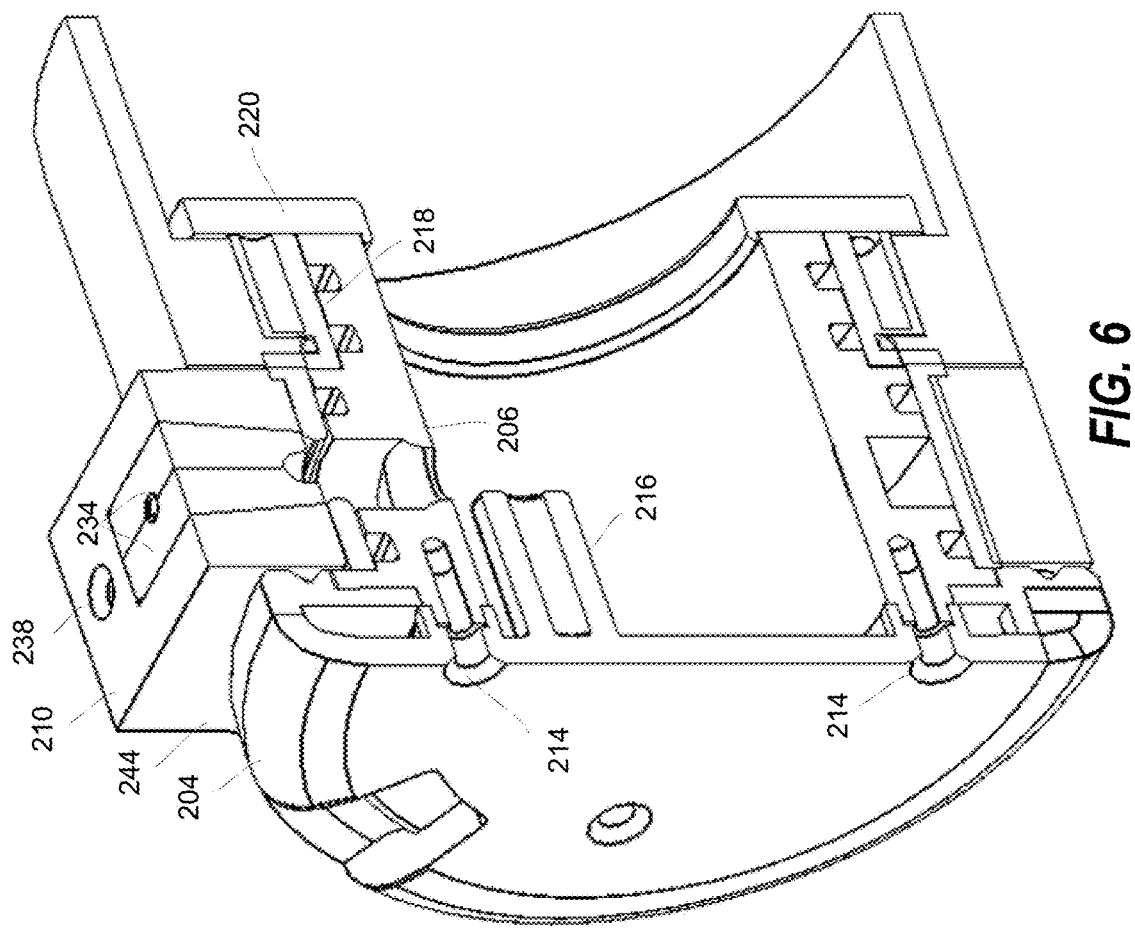
FIG. 6 is a sectional perspective view of the rotational joint of FIG. 4 taken along the plane 6-6.

The bracket 204 can be non-rotatingly connected to the first camera sub-assembly 120. As seen in FIG. 5, the bracket 204 includes a lateral side 212. The bracket 204 can engage (e.g., by a friction fit or molded with) with the handle (shown in FIG. 3) at the lateral side 212. When engaged with the handle, the bracket 204 can provide to components housed in the first camera sub-assembly 120. For instance, the bracket 204 can support one or more batteries 142 housed in the first camera sub-assembly 120. Appreciably, as seen from FIGS. 4 and 5, the bracket 204 can also be non-rotatingly connected to the central hub 206. FIG. 6 is a sectional perspective view of the rotational coupling assembly 200 taken along the sectional plane 6-6. As seen in FIG. 6, the bracket 204 is connected to the central hub 206 by way of fasteners 214. Thus, the bracket 204, and the first camera sub-assembly 120 may not rotate relative to the central hub 206 of the rotational coupling assembly 200. Alternatively, the bracket 204 can be integrally formed with the central hub 206. As seen in FIG. 5, the bracket 204 comprises a guide post 216 mounted thereon. The guide post 216 can guide one or more electrical cables of the camera 100 as will be described further below.

With continued reference to FIG. 5, in some embodiments, the rotational coupling assembly 200 includes a first rotational coupling 208. The first rotational coupling 208 can be mounted on an exterior surface 218 of the central hub 206. The first rotational coupling 208 can be rotatable relative to the central hub 206. The first rotational coupling 208 can be frictionally fitted against the exterior surface 218 of the central hub 206, so as to permit rotation therebetween. In some such embodiments, the first rotational coupling 208 can be a bushing. The first rotational coupling 206 can be of any shape. The second camera sub-assembly 130 can be connected to or integrally formed with the first rotational coupling 208, such that a rotation of the first rotational coupling 208 relative to the central hub 206 results in rotation of the second camera sub-assembly 130 relative to the central hub 206 and/or the first camera sub-assembly 120. The second camera sub-assembly 130 can be non-rotationally connected to the first rotational coupling 208 by any known means. For instance, the first rotational coupling 208 can be friction-fitted to a portion of the housing 102 corresponding to the second camera sub-assembly 130. Alternatively, the first rotational coupling 208 can be fastened to the second camera sub-assembly 130 (e.g., a body panel of the camera 100) by one or more fasteners. The first rotational coupling 208 can also be adhesively joined to the second camera sub-assembly 130. Many types of connection between the first rotational coupling 208 and the second camera sub-assembly 130 are contemplated. Alternatively, the first rotational coupling 208 can be integrally formed with the second camera sub-assembly 130.

In some exemplary embodiments, the second camera sub-assembly 130 can be rotated in an incremental manner. A first detent can be located adjacent to the first rotational coupling 208. The first detent can provide a catch between the first rotational coupling 208 and the central hub 206 to permit incremental rotational movement of the first rotational coupling 208. The first detent thus permits controlled rotation of the second camera sub-assembly 130 about the rotational axis 202. In the illustrated example, the first detent comprises a first detent ring 220 rigidly (non-rotationally) attached to the central hub 206. For instance, the first detent ring 220 comprises a set of connection points 221A, configured in the illustrated example as screw holes. The central hub 206 can have a set of corresponding connection points 221B, also configured in the illustrated example as screw holes. The fastener can be inserted into the screw holes 221A, 221B, thereby non-rotationally fastening the first detent ring 220 to the central hub 206. However, the illustrated fastening should not be construed as limiting, and other types of connections (e.g., molded, friction-fitted, adhesive connections) between the central hub 206 and the first detent ring 220 are contemplated. Advantageously, the non-rotational connection between the first detent ring 220 and the central hub 206 can be spaced (e.g., radially) such that the non-rotational connection between the first detent ring 220 and the central hub 206 may not interfere with the rotation of the first rotational coupling 208 and/or the rotation of the second rotational coupling 210 relative to the central hub 206.

Figure 7:
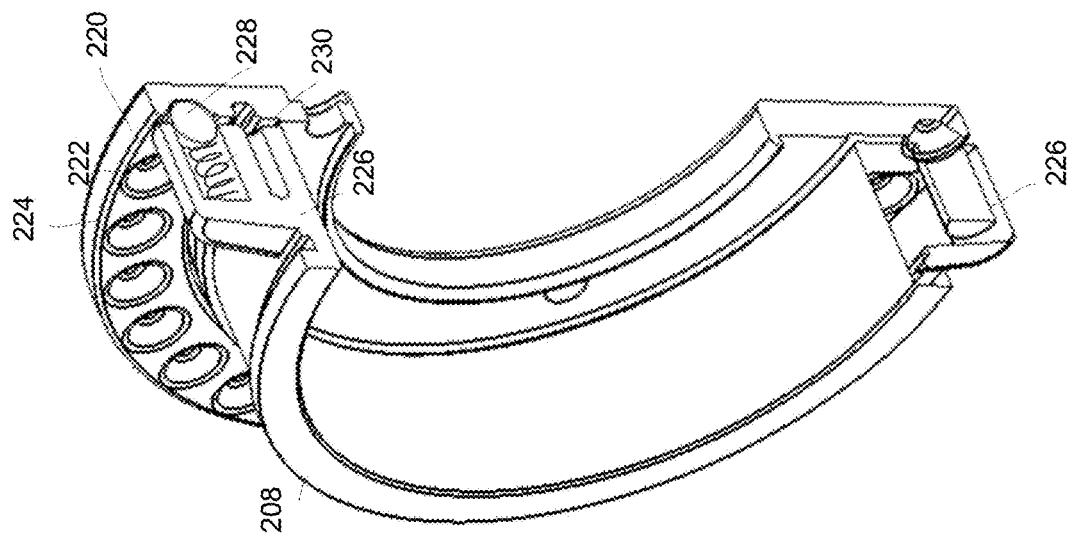
FIG. 7 is another sectional perspective view of the rotational joint of FIG. 4.

As best seen in the sectional view of FIG. 7, in certain embodiments, the first detent ring 220 has a plurality of apertures 222. The apertures 222 can be arranged circumferentially near an outer edge 224 of the first detent ring 220. Correspondingly, in such embodiments, the first rotational coupling 208 has a pair of external protrusion 226. While two protrusions 226 are illustrated (separated by 180°), additional or fewer protrusions are contemplated. Each protrusion houses a first spring-biased detent ball 228. For ease of illustration, FIG. 7 illustrates the first spring-biased detent ball 228 in the top protrusion 226, though, the bottom protrusion can also have another first spring-biased detent ball 228. The first spring-biased detent ball 228 can be biased by a spring 230 to be received in one of the plurality of apertures 222 thereby frictionally engaging the first detent ring 220 with the first rotational coupling 208. While the illustrated example include apertures on the first detent ring 220, and a spring-biased detent ball housed in an external protrusion 226 of the first rotational coupling 208, in other embodiments, the first rotational coupling 208 can have a plurality of apertures, while the first detent ring 220 can house the first spring-biased detent ball 228.

As seen in FIG. 7, and as would be appreciable, each aperture 222 of the first detent ring 220 corresponds to a rotational position of the second camera sub-assembly 130. When the first rotational coupling 208 is rotated relative to the central hub 206, the first detent ring 220 stays stationary and the torque applied on the first rotational coupling 208 overcomes the spring bias of the first spring-biased detent ball 228, thereby frictionally sliding the first spring-biased detent ball 228 into another aperture 222. Thus, the first rotational coupling 208 can be moved in a controlled fashion, incrementing the rotation of the second camera sub-assembly 130 in rotational steps. Such advantageous exemplary embodiments provide a more positive haptic feedback of the rotation of the second camera sub-assembly 130 to the user.

Referring back to FIG. 6, the second rotational coupling 210 is mounted on the exterior surface 218 of the central hub 206, and is rotatable relative to the central hub 206. The third camera sub-assembly 140 is connected to and/or integrally formed with the second rotational coupling 210, such that a rotation of the second rotational coupling 210 relative to the central hub 206 results in rotation of the third camera sub-assembly 140 relative to the central hub 206 and/or the first camera sub-assembly 120. The second rotational coupling 210 can be frictionally fitted against the exterior surface 218 of the central hub 206, so as to permit rotation therebetween. In the illustrated embodiment, the third camera sub-assembly 140 is connected to the second rotational coupling 210 by a frictional connector 232.

With continued reference to the exemplary embodiment of FIG. 6, in some embodiments, the frictional connector 232 comprises a pair of wedges 234 housed in a slot defined on the ring. The pair of wedges 234 can be configured to frictionally hold and guide the first electrical cable 162 therebetween as will be described further below. The frictional connector 232 permits a rigid connection between a display housing 236 forming a portion of the third camera sub-assembly 140 such that when the second rotational coupling 210 rotates relative to the central hub 206, the third camera sub-assembly 140 can rotate relative to the first camera sub-assembly 120.

Figure 8:
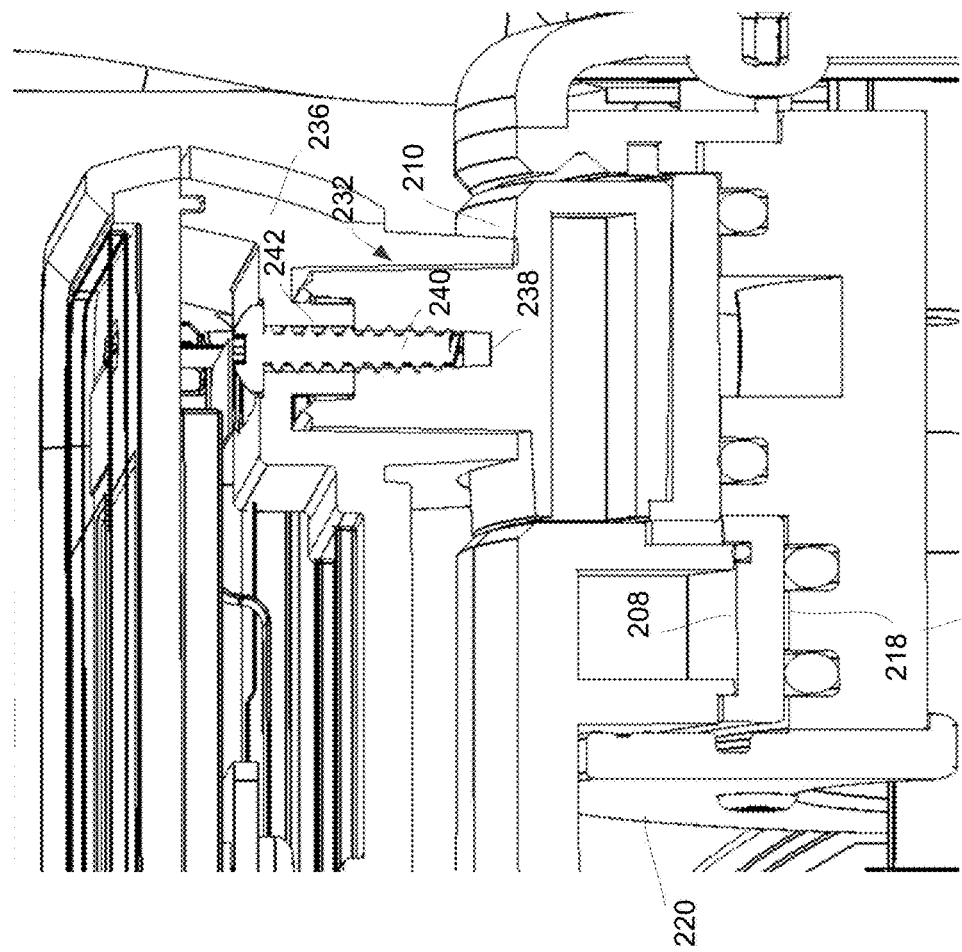
FIG. 8 is a sectional perspective view showing an enlarged portion of FIG. 3.

FIG. 8 is an illustrative sectional perspective view of an upper portion of the camera 100. As illustrated therein, the frictional connector 232 can permit a rigid connection between the ring and the third camera sub-assembly 140. In the illustrated embodiment of FIG. 8, the second rotational coupling 210 threadingly engages with the display housing 236 that houses the display 108 and the display circuit board 160. The second rotational coupling 210 includes a screw hole 238 for receiving a screw 240 (or another fastener). The screw 240 passes through a corresponding aperture 242 of the display housing 236, thereby non-rotationally fastening the display housing 236 to the second rotational coupling 210. While a fastener is illustrated, other types of non-rotational connection (e.g., friction fit, mold, adhesive connection and the like) between the display 108 and the second rotational coupling 210 are contemplated.

Figure 9:
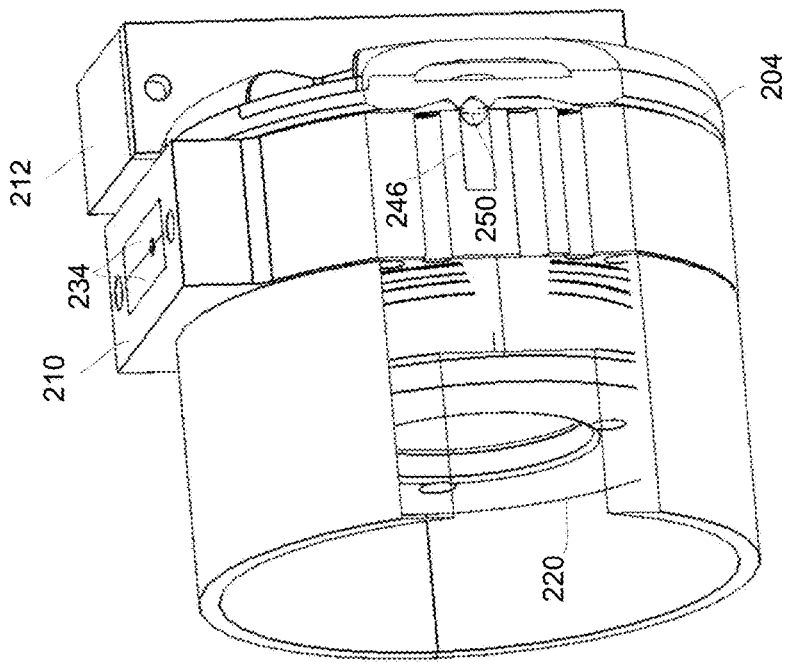
FIG. 9 is another sectional perspective view of the rotational joint of FIG. 4.

In some exemplary embodiments, the third camera sub-assembly 140 can be rotated in an incremental manner. Accordingly, a second detent can be located between the second rotational coupling 210 and the first camera sub-assembly 120 to provide a catch therebetween to permit incremental rotational movement of the second rotational coupling 210. The second detent thus permits controlled rotation of the second camera sub-assembly 130 about the rotational axis 202. FIG. 9 illustrates an enlarged sectional perspective view of a portion of the rotational coupling assembly 200. As seen therein, the second detent can include apertures and a spring-biased ball as was the case with the first detent. In the illustrated embodiment, the second rotational coupling 210 has an exterior surface 244 (best seen in FIG. 6) that, as shown in FIG. 9, has a plurality of apertures 246. The apertures 246 can be distributed circumferentially on the exterior surface 244 (e.g., as seen on an opposite exterior surface 248 of FIG. 6). Returning to FIG. 9, one of the plurality of apertures 246 of the exterior surface 244 of the second rotational coupling 210 can receive a second spring-biased detent ball 250 housed in a groove of the bracket 204. While FIG. 6 illustrates the bracket 204 as having three grooves, additional or fewer grooves are contemplated. The second spring-biased detent ball 250 can be biased by a spring (not shown) to be received in one of the plurality of apertures 246 thereby frictionally actuating the second detent. While the illustrated example include apertures on the second rotational coupling 210, and a spring biased detent ball housed in the bracket 204, in other embodiments, the bracket 204 can have a plurality of apertures, while the second rotational coupling 210 can house the second spring-biased detent ball 250. Alternatively, a separate detent ring can be provided instead of providing apertures on the exterior surface 244 of the second rotational coupling 210.

As seen in the exemplary embodiment of FIG. 9, and as would be appreciable, each aperture 246 of the second rotational coupling 210 corresponds to a rotational position of the third camera sub-assembly 140. When the second rotational coupling 210 is rotated relative to the central hub 206, the bracket 204 stays stationary and the torque applied on the second rotational coupling 210 overcomes the spring bias of the second spring-biased detent ball 250, thereby frictionally sliding the second spring-biased detent ball 250 into another aperture 246. Thus, the second rotational coupling 210 can be moved in a controlled fashion, incrementing the rotation of the third camera sub-assembly 140 in rotational steps. Such advantageous exemplary embodiments provide a more positive haptic feedback of the rotation of the third camera sub-assembly 140 to the user.

Figure 10A:
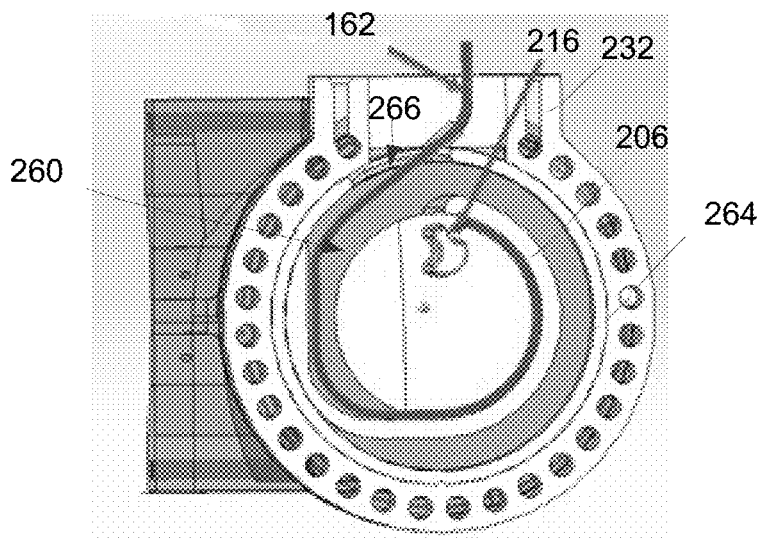
FIGS. 10A, 10B, 10C illustrate a front view of the rotational joint of FIG. 4 in various rotational positions.
Figure 10B:
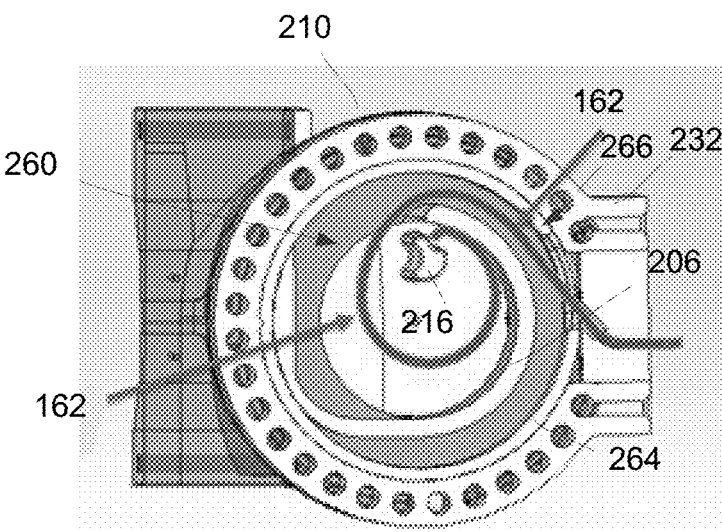
Figure 10C:
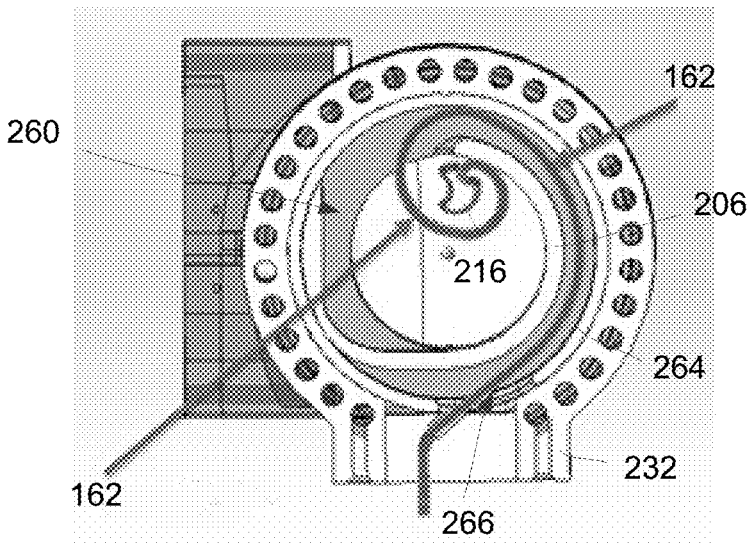

In certain advantageous exemplary embodiments, the rotational coupling assembly 200 can facilitate routing of electrical cables in the assembly so as to reduce bending or twisting of cables during rotation of the second and/or third camera sub-assemblies 130, 140. FIGS. 10A, 10B, 10C illustrate various positions of the first electrical cable 162 as routed by the rotational coupling assembly 200 according to certain non-limiting exemplary embodiments. Accordingly, in some such embodiments, as seen in FIG. 6, and FIGS. 10A-10C the rotational coupling assembly 200 has a first slot 260 defined on a perimeter of a portion of the central hub 206 to guide the first electrical cable 162. When the third camera sub-assembly 140 rotates about a rotational axis 202, the first electrical cable 162 is guided by the first slot 260 so as to wrap around the perimeter of the central hub 206, and thereby be guided between the display housing 236 (that houses the display circuit board 160) and the primary circuit board 150. The first electrical cable 162 thus generally conforms to the contours of the portion of the perimeter of the central hub 206 when the third camera sub-assembly 140 rotates about the rotational axis 202. Appreciably, the first electrical cable 162 can connect other electrical components in various camera sub-assemblies and the electrical connections of the first electrical cable 162 (and/or those of the second electrical cable 170 should not be viewed as limiting). Referring back to FIG. 1B, the second electrical cable 170 can also be guided through the first slot 260 so as to wrap around the perimeter of the central hub 206.

Referring back to FIG. 6, in an exemplary embodiment, the first slot 260 is defined on the central hub 206. The first slot 260 can be formed by removing a portion of the surface 262 of the central hub 206. The first slot 260 can extend substantially around the perimeter of the central hub 206. For instance, the first slot 260 can extend between about 5% and about 90% of the perimeter of the central hub 206 (corresponding to removing about 10% to about 95% of the surface 262). In the illustrated embodiments of FIGS. 10A-10C, the first slot 260 extends about 50% of the perimeter of the central hub 206.

As seen in exemplary embodiments of FIGS. 10A-10B, the first electrical cable 162 can be anchored by the guide post 216 so as to coil around the first slot 260. When the third camera sub-assembly 140 is rotated, the first electrical cable 162 is held generally stationary relative to the third camera sub-assembly 140, however is permitted coil radially relative to the rotational axis 202. In FIG. 10A, the second rotational coupling 210 is at a first rotational position with respect to the rotational axis 202, corresponding to the third camera sub-assembly 140 being at a position shown in FIGS. 1-3. Returning to FIG. 10B, the second rotational coupling 210 is rotated to a second rotational position, forming an angle of about 90° relative to the first rotational position. In the second rotational position, the rotation of the second rotational coupling 210 relative to the central hub 206 (and thereby with respect to the first slot 260) results in coiling of the first electrical cable 162 radially inwardly. Thus, the first electrical cable 162 forms a coiled portion of a smaller perimeter than the perimeter of the coiled portion in FIG. 10A.

Referencing FIG. 10C, the second rotational coupling 210 is rotated to a third rotational position, forming an angle of about 180° relative to the first rotational position and about 90° relative to the second rotational position. In the third rotational position, the rotation of the second rotational coupling 210 relative to the central hub 206 (and thereby with respect to the first slot 260) results in coiling of the first electrical cable 162 radially inwardly even further from that illustrated in FIG. 10B. Thus, the first electrical cable 162 forms a coiled portion of a perimeter in FIG. 10C, that is less than the perimeter of the coiled portion in FIG. 10B. If the second rotational coupling 210 were rotated again to the second rotational position and/or to the first rotational position, the first electrical cable 162 is returned to the coiled portions shown in FIGS. 10B and 10A respectively, as a result of the anchoring provided by the guide post 216 and/or the guiding provided by the first slot 260. The first electrical cable 162 can thus be wrapped and/or unwrapped in a guided fashion around the central hub 206. Advantageously, such embodiments provide a reduced chance of bending or pinching of the first electrical cable 162 when the second rotational coupling 210 (and thus the display 108) is rotated relative to the central hub 206 (and/or the handle).

As mentioned previously with respect to FIG. 3, in some embodiments the first camera sub-assembly 120 houses a battery in electrical communication with the image sensor and/or the electrical circuits via a second electrical cable 170. While FIGS. 10A-10C illustrate guiding of the first electrical cable 162, it should be understood that the second electrical cable 170 can also be anchored by the guide post 216 and/or guided by the first slot 260.

The guide post 216 and/or the first slot 260 thus anchor and route the first electrical cable 162 and/or the second electrical cable 170 so as to space the first and second electrical cables apart and be in a non-interfering state with respect to each other.

In some non-limiting exemplary embodiments, the rotational coupling assembly 200 can include one or more seals, and/or bushing 264 that permit continuous rotation of various camera sub-assemblies 120, 130, 140 with a predetermined friction. The bushings and/or seals can be in lieu of or in addition to the detent rings disclosed previously. For instance, FIGS. 10A-10C illustrate a bushing 264 provided on the second rotational coupling 210. The bushing 264 can be made of elastomeric materials. In an exemplary embodiment, the bushing can be made of Teflon, though other materials are contemplated. The bushing 264 can include a movable slot 266 that can rotate along with the second rotational coupling 210. The first electrical cable 162 can leave the first slot 260 by way of the movable slot 266 and be guided toward the display housing 236 by the frictional connector 232 (best seen in FIG. 6). Referring again to FIG. 6, the pair of wedges 234 each include a semi-circular slot 268 to guide the first electrical cable 162 toward the display housing 236. Thus, the first electrical cable 162 can be held securely during rotation of the second rotational coupling 210. The bushing 264 can control friction during rotation of the second rotational coupling 210.

Figure 11:
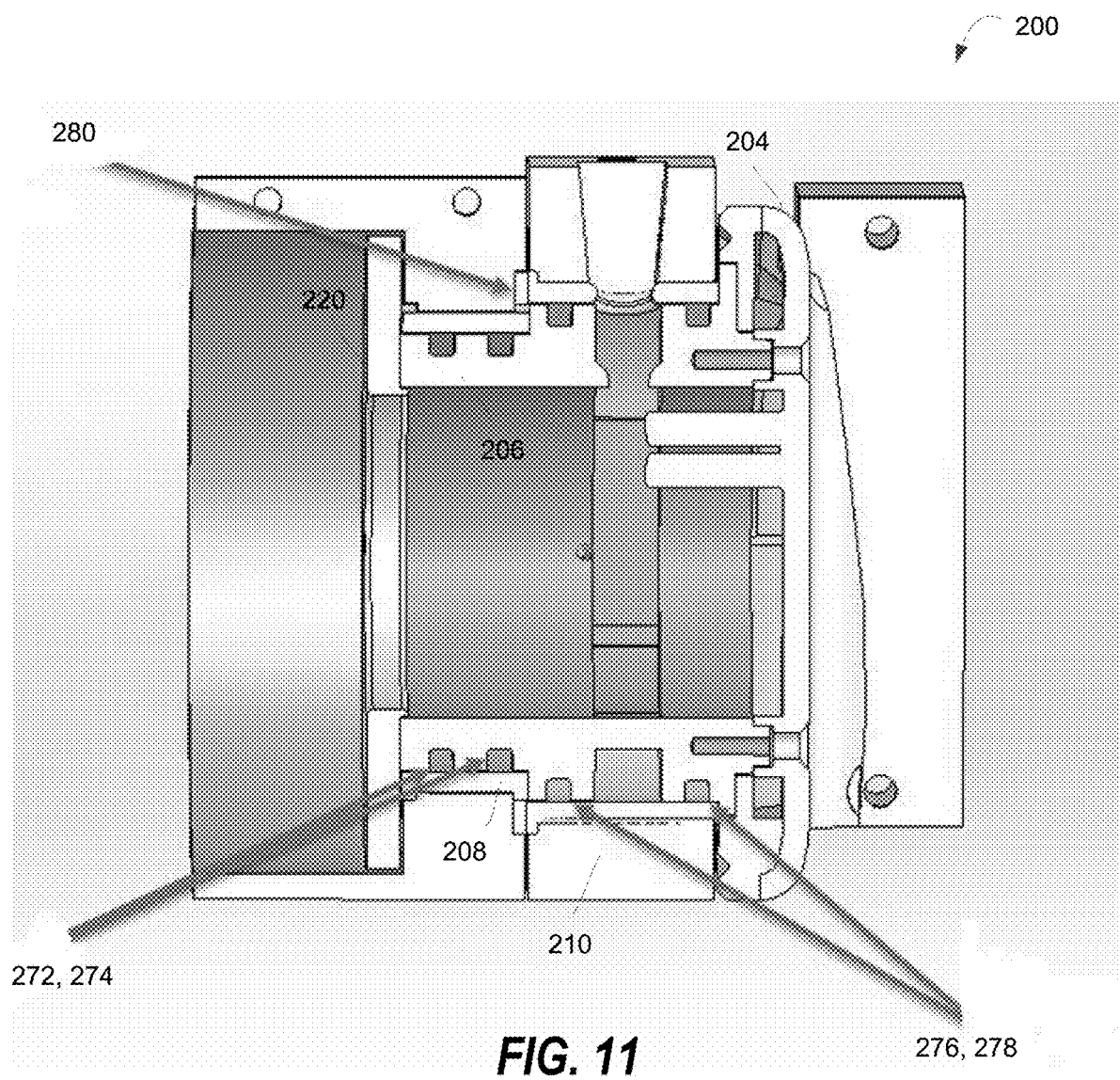
FIG. 11 is another cross-sectional view of the rotational joint of FIG. 4.

While FIGS. 10A-10C illustrate a single bushing 264 attached to the second rotational coupling 210, additional or fewer seals or bushing 264 can be provided to seal the rotational coupling assembly 200, and other components of the camera 100 from external contaminants (e.g., fluids, dust, etc.). For instance, referring back to FIG. 5, the rotational coupling assembly 200 includes a seal 270. However, as shown in FIG. 11, additional seals 272, 274, 276, 278 are contemplated. The seals 272, 274, 276, 278 can, in one embodiment, be an O-ring. In an embodiment, the O-rings are made of a Buna-N synthetic copolymer, though, other materials that are durable and provide dynamic sealing are contemplated. The O-rings 272, 274 can provide additional friction during rotation of the first rotational coupling 208 relative to the first detent ring 220. The O-rings 272, 274 can also provide shock absorption and share loads. O-rings 276, 278 can act as dynamic seals during rotation of the rotational coupling assembly 200 and seal around the first electrical cable 162. Additional seals are also contemplated. For instance, FIG. 11 illustrates a washer 280 to control friction. It should be noted that other types of seals, O-rings, washers and the like can be provided. While detent rings, seals, O-rings and bushings are illustrated, it should be understood that other types of couplings (e.g., magnetic couplings) can provide a controlled rotation (e.g., continuous or discrete) of the various camera sub-assemblies.

In some such embodiments, the rotational coupling assembly 200 can be fabricated to have sufficient clearance between various components thereof. In such cases, O-rings can be provided between rotating and stationary components of the rotational coupling assembly 200 to provide compliance in the joint and to provide shock-absorption. Advantageously, certain embodiments of the present disclosure also ensure that the rotational coupling assembly 200 can withstand drop loads, for instance, during a one-meter drop.

In advantageous embodiments, the camera can be torque balanced such that the camera has zero net torque acting thereupon when no torque is applied on the camera (or portions thereof). When an applied torque acts on one of the first rotational coupling or the second rotational coupling, the coupling on which torque is applied rotates to a new rotational position independently of the other of the first rotational coupling or the second rotational coupling. When the applied torque stops acting on the one of the first rotational coupling or the second rotational coupling, forces and torques acting on the camera are balanced, such that net torque acting on the camera is zero. Accordingly, one of the first rotational coupling or the second rotational coupling (on which an applied torque acted) remains in the new position. Advantageously, in some such embodiments, the hub can remain stationary. In cases where the hub is connected to the handle of the camera, for instance, such embodiments can advantageously result in the user holding the handle in a stationary position and rotating only the desired sub-assembly (e.g., camera body and/or display) by applying a torque. Further, once moved to the new position, the user may not have to continue applying torque to keep the sub-assembly in its new position.

As used herein, "IR" may refer to wavelengths in any portion of the infrared spectrum, such as LWIR (between approximately 8 microns and 14 microns), MWIR (between approximately 3 microns and 5 microns), SWIR (between approximately 1 micron and approximately 2 microns), or any combination of these ranges or wavelengths therebetween. "VL" images typically refer to wavelengths in the visible spectrum (e.g., between approximately 400 nanometers and approximately 700 nanometers). However, the processes as described herein for use with VL images may be performed using alternative wavelengths, such as NIR (e.g., between approximately 700 nm and 1000 nm) or UV (e.g., between approximately 200 nm and 400 nm). In general, processes for combining IR and VL images described herein may be performed on any set of two or more images.

Various aspects of methods described herein may be adjusted by a user. For example, a thermal imaging camera capable of executing such methods may include a user interface 158 (e.g., 108, 112, 114, 116) for receiving one or more inputs from a user. In some examples, a user may adjust at least one of, for example, the IR palettization scheme, an edge gain used for determining edge factor values, the edge midscale value, a type of image blending (e.g., constant across image, EFV-dependent, a combination thereof, and the like), the amount of image blending (e.g., blending ratios). In other embodiments, one or more of such parameters may be fixed.

Example thermal image cameras and related techniques have been described. The techniques described in this disclosure may also be embodied or encoded in a computer-readable medium, such as a non-transitory computer-readable storage medium containing instructions. Instructions embedded or encoded in a computer-readable storage medium may cause a programmable processor 152, or other processor 152, to perform the method, e.g., when the instructions are executed. Computer readable storage media may include random access memory (RAM), read only memory (ROM), a hard disk, optical media, or other computer readable media.

For example, an external computer comprising such computer readable medium can receive corresponding visible light and infrared images from a thermal imaging camera or from memory and perform edge detection and/or process the VL and IR images to generate display 108 images as described herein. In some embodiments, various portions of the techniques can be embodied in multiple components. For example, a thermal imaging camera can detect edges in a visible light image and pass detected edge information to an external computing device for generating the display 108 image incorporating the detected edges. Additionally or alternatively, the external computing device may assist in or otherwise perform edge detection and/or enhancement techniques.

In further examples, embodiments of the invention can be embodied in a display 108 system. The display 108 system can be configured to receive VL and IR image data and carry out processes such as those herein described. Exemplary display 108 systems can include one or more processors, a display 108 and a user interface 158 for carrying out such processes. A display 108 system can be incorporated into any appropriate device or system capable of receiving and processing image data. In some embodiments, the display 108 system can include a portable, hand-held thermal imaging camera such as those described elsewhere herein in order to capture corresponding VL and IR images and provide VL and IR image data to other components of the imaging system. In further embodiments, the imaging system is fully incorporated into such a camera, or can consist essentially of a camera capable of carrying out any of the various processes described.

Various embodiments have been described. Such examples are non-limiting, and do not define or limit the scope of the invention in any way. Rather, these and other examples are within the scope of the following claims.

The invention claimed is:

1. A camera, comprising:
a hub coupled to a first camera sub-assembly, the hub including a slot defined at a perimeter portion of the hub, the first camera sub-assembly comprising a handle for holding the camera;
a first rotational coupling rotatably coupled to the hub permitting rotational movement between the first rotational coupling and the hub, the first rotational coupling carrying and/or coupled to a second camera sub-assembly, and
a second rotational coupling rotatably coupled to the hub permitting rotational movement between the second rotational coupling and the hub, the second rotational coupling carrying and/or coupled to a third camera sub-assembly, wherein one of the second camera sub-assembly and the third camera sub-assembly comprises a display,
two or more of the first camera sub-assembly, the second camera sub-assembly and the third camera sub-assembly being in electrical communication via the hub, wherein rotational movement of at least one of the first rotational coupling and the second rotational coupling extends an electrical cable out from the slot to be positioned around the hub.

2. The camera of claim 1, wherein the hub is centered on a rotational axis such that the hub is symmetric about the rotational axis.

3. The camera of claim 1, wherein the second camera sub-assembly is rotatable with respect to the hub independently of rotation of the third camera sub-assembly with respect to the hub.

4. The camera of claim 1, wherein the second rotational coupling being mounted on an exterior surface of the hub, and rotatable relative thereto, wherein rotational movement of at least one of the first rotational coupling and the second rotational coupling extends the electrical cable out from the slot to be positioned around the exterior surface of the hub.

5. The camera of claim 4, wherein the hub is connected to the first camera sub-assembly via a bracket.

6. The camera of claim 5, further comprising a first detent, and wherein the first detent is located between the first rotational coupling and the hub, the first detent providing a catch between the first rotational coupling and the hub to permit incremental rotational movement of the first rotational coupling relative to the hub.

7. The camera of claim 6, wherein the first detent comprises a first detent ring, the first detent ring having a plurality of apertures, one of the plurality of apertures receiving a first spring-biased detent ball housed in an external protrusion of the first rotational coupling, the first spring-biased detent ball being biased by a spring to be received in one of the plurality of apertures thereby engaging the first detent ring with the first rotational coupling.

8. The camera of claim 7, wherein the first detent permits controlled rotation of the second camera sub-assembly about the hub, such that each aperture of the plurality of apertures of the first detent ring corresponds to a rotational position of the second camera sub-assembly.

9. The camera of claim 5, wherein the second rotational coupling is mounted on the exterior surface of the hub.

10. The camera of claim 9, further comprising a second detent located between the second rotational coupling and the bracket, the second detent providing a catch between the bracket and the second rotational coupling to permit incremental rotational movement of the second rotational coupling.

11. The camera of claim 10, wherein the second rotational coupling has an exterior surface having a plurality of apertures, one of the plurality of apertures of the exterior surface of the second rotational coupling, receiving a second spring-biased detent ball housed in a groove on the bracket.

12. The camera of claim 11, wherein each aperture of the plurality of apertures of the exterior surface of the second rotational coupling corresponds to a rotational position of the third camera sub-assembly.

13. The camera of claim 12, wherein the second spring-biased detent ball being biased to be received in one of the plurality of apertures of the exterior surface of the second rotational coupling, the second spring-biased detent ball frictionally resting against the groove in the bracket when the second rotational coupling is in between two rotational positions.

14. A camera, comprising:
a central hub;
a first camera sub-assembly coupled to the central hub and having electrical components;
a rotational coupling rotatably coupled about the central hub permitting rotation of the rotational coupling about the central hub, the rotational coupling carrying and/or coupled to a second camera sub-assembly, the second camera sub-assembly electrically connecting to the first camera sub-assembly via an electrical cable extending through the central hub, the rotational coupling comprising a slot defined on a perimeter of the rotational coupling and rotating with the rotational coupling, the electrical cable extending through the slot towards the central hub, the slot guiding the electrical cable, such that when the rotational coupling rotates about the central hub, the electrical cable is guided by the slot so as to wrap the electrical cable around the central hub.

15. The camera of claim 14, wherein the electrical cable generally conforms to contours of the perimeter of the central hub when the rotational coupling is rotated.

16. The camera of claim 14, wherein the rotational coupling comprises a frictional connector permitting a rigid connection between the rotational coupling and the second camera sub-assembly.

17. The camera of claim 16, wherein the frictional connector comprises a pair of wedges to frictionally hold the electrical cable therebetween, such that when the second camera sub-assembly is rotated, the electrical cable is held generally stationary relative to the second camera sub-assembly.

18. The camera of claim 14, wherein the electrical cable has a first end and a second end opposite to the first end, the first end of the electrical cable being located in the second camera sub-assembly, the second end of the electrical cable being connected to the electrical components of the first camera sub-assembly.

19. The camera of claim 18, further comprising a guide post to guide and anchor the electrical cable at a location within the central hub, and/or between the first end and the second end.

20. The camera of claim 14, further comprising a third camera sub-assembly, wherein the rotational coupling and/or the second camera sub-assembly is positioned axially between first camera sub-assembly and the third camera sub-assembly.

21. A camera, comprising:
a hub non-rotationally coupled to a first camera sub-assembly, the first camera sub-assembly comprising a handle for holding the camera;
a first rotational coupling rotatably coupled to the hub permitting rotational movement between the first rotational coupling and the hub, the first rotational coupling carrying and/or coupled to a second camera sub-assembly, and
a second rotational coupling rotatably coupled to the hub permitting rotational movement between the second rotational coupling and the hub, the second rotational coupling carrying and/or coupled to a third camera sub-assembly,
the second rotational coupling being physically engaged to the first rotational coupling,
wherein, when an applied torque acts on one of the first rotational coupling or the second rotational coupling:
the hub remains stationary,
the one of the first rotational coupling or the second rotational coupling rotates to a new rotational position independently of the other of the first rotational coupling or the second rotational coupling, and
an electrical cable electrically connecting two or more of the first camera sub-assembly, the second camera sub-assembly, and the third camera sub-assembly is extended out from the hub to be positioned around the hub, and
when the applied torque stops acting on the one of the first rotational coupling or the second rotational coupling, net torque acting on the camera is zero such that the one of the first rotational coupling or the second rotational coupling remains in the new position.

22. The camera of claim 21, comprising the second rotational coupling being indirectly physically engaged to the first rotational coupling.

* * * * *